(12) United States Patent
Bazar et al.

(10) Patent No.: US 9,930,542 B2
(45) Date of Patent: Mar. 27, 2018

(54) AUTOMATIC NEIGHBOUR RELATIONS IN A COMMUNICATIONS NETWORK

(75) Inventors: Isman Bazar, Tokyo (JP); Masatoshi Nakamata, Kawasaki (JP)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 13/985,368

(22) PCT Filed: Feb. 8, 2012

(86) PCT No.: PCT/EP2012/052099
§ 371 (c)(1),
(2), (4) Date: Sep. 26, 2013

(87) PCT Pub. No.: WO2012/110372
PCT Pub. Date: Aug. 23, 2012

(65) Prior Publication Data
US 2014/0018080 A1    Jan. 16, 2014

(30) Foreign Application Priority Data
Feb. 14, 2011   (WO) ................. PCT/EP2011/052115

(51) Int. Cl.
*H04W 36/00* (2009.01)
*H04W 48/16* (2009.01)
*H04W 24/02* (2009.01)

(52) U.S. Cl.
CPC ................... *H04W 24/02* (2013.01)

(58) Field of Classification Search
CPC ............. H04W 36/0083; H04W 48/16; H04W 36/0061; H04W 24/10

USPC ...................... 455/422.1, 423, 424, 436–443
See application file for complete search history.

(56) References Cited

U.S. PATENT DOCUMENTS

| | | | | |
|---|---|---|---|---|
| 2002/0151304 | A1* | 10/2002 | Hogan | H04W 36/10 455/436 |
| 2004/0152480 | A1* | 8/2004 | Willars | H04B 7/18541 455/513 |
| 2007/0202877 | A1* | 8/2007 | Hogan | H04W 36/10 455/436 |
| 2007/0213086 | A1* | 9/2007 | Claussen | H04W 16/18 455/513 |
| 2009/0005052 | A1* | 1/2009 | Abusch-Magder | H04W 24/02 455/446 |
| 2009/0247159 | A1* | 10/2009 | Flore | H04W 24/02 455/434 |

(Continued)

OTHER PUBLICATIONS

3GPP TSG-RAN WG3 Meeting #70bis, Dublin, Ireland, Jan. 17-21, 2011, R3-110150, "Log ANR approach support with LUR", ZTE, 25 pgs.

(Continued)

*Primary Examiner* — Dung Hong
(74) *Attorney, Agent, or Firm* — Harrington & Smith

(57) ABSTRACT

A method is provided, which includes receiving an automatic neighbor relation log at a control node, forwarding a log entry from the automatic neighbor relation log to a neighboring control node related to a cell contained in the log, receiving the log entry at the neighboring control node and updating a neighbor cell list of the related cell with neighbor cell parameters contained in the log entry.

10 Claims, 8 Drawing Sheets

(56) References Cited

U.S. PATENT DOCUMENTS

| | | | | |
|---|---|---|---|---|
| 2009/0270079 A1* | 10/2009 | Han | ............... | H04W 36/0061 455/414.1 |
| 2011/0014919 A1* | 1/2011 | Otte | ............... | H04W 36/0061 455/442 |
| 2011/0111755 A1* | 5/2011 | Chen | ............... | H04W 36/0061 455/434 |
| 2011/0207456 A1* | 8/2011 | Radulescu | ........ | H04W 36/0061 455/434 |
| 2011/0228687 A1* | 9/2011 | Catovic | ............ | H04W 36/0083 370/252 |
| 2012/0106370 A1* | 5/2012 | Radulescu | ........ | H04W 36/0083 370/252 |
| 2012/0178451 A1* | 7/2012 | Kubota | ............... | H04W 8/00 455/436 |

OTHER PUBLICATIONS

3GPP TSG RAN WG3 Meeting #70bis, Dublin, Ireland, Jan. 17-21, 2011, R3-110278, "UMTS ANR: Inter Node Information Exchange", Ericsson, 6 pgs.

\* cited by examiner

An example of ANR Log from UE1:
1_entry: BaseCell.C1(RNC_A, L1 Info,L2 Info), NeighbourCell.C2(RNC_B, L1 Info, L2 Info);
2_entry: BaseCell.C4(RNC_A, L1 Info,L2 Info), NeighbourCell.C9(RNC_C, L1 Info, L2 Info);
......
N_entry: BaseCell.C6(L1 Info,L2 Info), NeighbourCell.C2(L1 Info, L2 Info);

FIG. 6

An example of ANR Log from UE2:
1_entry: BaseCell.C1(RNC_C, L1 Info,L2 Info), NeighbourCell.C2(RNC_D, L1 Info, L2 Info);
2_entry: BaseCell.C1(RNC_A, L1 Info,L2 Info), NeighbourCell.C2(RNC_B, L1 Info, L2 Info);

FIG. 7

AUTOMATIC NEIGHBOUR RELATIONS IN A COMMUNICATIONS NETWORK

FIELD OF THE INVENTION

The invention generally relates to automatic neighbour relations in a communications network.

BACKGROUND OF THE INVENTION

Neighbour cell relationships between neighbouring cells in a wireless communications network are difficult for mobile network operators to plan and verify manually in real network deployment.

An automatic neighbour relation (ANR) mechanism is introduced in 3GPP Release 10 feature. This feature enables automatic detection of neighbour cells, which are then added to a neighbour cell list. This reduces the cost and effort required in manually planning neighbour cell relationships.

However, a problem with the ANR mechanism is that it results in heavy data traffic between elements of a network, since they must communicate with each other in order to update neighbour cell lists.

SUMMARY OF THE INVENTION

Accordingly, the invention provides a method, which includes receiving an automatic neighbour relation log at a control node, forwarding a log entry from the automatic neighbour relation log to a neighbouring control node related to a cell contained in the log, receiving the log entry at the neighbouring control node, and updating a neighbour cell list of the related cell with neighbour cell parameters contained in the log entry.

A first control node receives an automatic neighbour relation log from a mobile station, for example, that has collected the automatic neighbour relation log. The first control node forwards a log entry from the automatic neighbour relation log to a neighbouring control node; i.e., a control node that is directly coupled to the first control node, related to a cell contained in the log. In other words, the first control node only forwards log entries from the automatic neighbour relation log to those control nodes that control cells to which the log entries relate. When the neighbouring control node receives the log entry, it updates a neighbour cell list belonging to its related cell with the neighbour cell parameters contained in the log entry.

The first control node only forwards the reported neighbour cell relation information to those control nodes controlling the reported cells. This provides the advantage of significantly reduced network traffic and speeds up the process of defining neighbour cell relationships in a cell.

Preferably, the control node is a radio network controller (RNC), as is the neighbouring control node.

The neighbouring control node may evaluate a reported cell relationship contained in the log entry and update the neighbour cell list of the reported cell with the reported neighbouring cell parameters.

Advantageously, a log entry or entries not relevant to the cell(s) related to the neighbouring control node can be filtered out of the automatic neighbour relation log. This means that it is possible to forward only selected or relevant entries to the control nodes controlling cells to which the entries relate, thereby further reducing network traffic.

Forwarding the log entry to the neighbouring control node may include indicating only the log entry relevant to the cell related to the neighbouring control node. In other words, several log entries may be sent to the neighbouring control node but the first control node can provide an indication as to which entries are relevant to the cell(s) controlled by the control node. The other, irrelevant log entries may then be discarded.

Alternatively, forwarding the log entry to the neighbouring control node may include sending only the log entry relevant to the cell related to the neighbouring control node.

The neighbouring control node can inform the control node sending the log entry that no log entry for the related cell is required. This could occur if a certain condition is met, for example according to network operator deployment policies or if a maximum number of log entries for cells related to the neighbouring control node has already been reached. The neighbouring control node may provide this information either autonomously or as a response message.

The neighbouring control node may also include a mechanism for ignoring the log entry if the neighbour cell list of a cell or cells controlled by the neighbouring control node already contains the log entry.

The invention further provides a control node for a communications network. The control node includes a receiver for receiving an automatic neighbour relation log. A transmitter is configured to forward a log entry of the automatic neighbour relation log to a neighbouring control node related to a cell contained in the log. The control node only sends the log entry or entries to those control nodes controlling a cell or cells to which log entries of the automatic neighbour relation log relate. This provides the advantage of significantly reducing network load. Furthermore, it allows for efforts in network planning to be reduced, since new cells may be added to the network without prior planning and prior synchronisation with deployed control nodes.

Preferably, the control node includes a filter, which is configured to filter out a log entry not relevant to the cell related to the neighbouring control node. In this way, only the log entries relevant to cells controlled by the neighbouring control node are received by the neighbouring control node, which further reduces the load on the network.

The transmitter of the network may be configured to indicate only the log entry relevant to the cell related to the neighbouring control node. In this way, several log entries from the automatic neighbour relation log may be sent to the neighbouring control node but it can ignore all but those relevant to the cells under its control. Alternatively, the transmitter may be configured to send only the log entry relevant to the cell related to the neighbouring control node, which provides the advantage of reduced traffic over the interface between control nodes.

The invention further provides a control node for controlling a cell of a communications network. The control node includes a receiver for receiving a log entry from an automatic neighbour relation log relating to the cell. A database is provided for storing a neighbour cell list of the cell, and a processor is configured to update the neighbour cell list with neighbour cell parameters contained in the log entry. Since the control node only receives automatic neighbour relation log entries relevant to the cells under its control, this provides the advantage of significantly reducing network traffic and simplifying network planning.

The processor may be further configured to evaluate a reported cell relationship contained in the log entry. In this way, it can be determined if the log entry is relevant to a cell under the control of a control node. If the log entry is not relevant, it can be ignored by the control node, which significantly reduces processing overheads. For example, the processor may be configured to ignore the log entry if the neighbour cell list of the cell stored in the database already contains said log entry.

Preferably, the control node is a radio network controller.

The control node may further include a transmitter configured to transmit information that no log entry for the related cell is required, for example if a certain condition is met such as according to network operator deployment policies or if a maximum number of log entries for cells controlled by the control node has already been reached. In this way, if the maximum number of neighbour cells allowed for a cell under control of the control node has already been reached, for example, the control node may provide the information that automatic neighbour relation log entries for that cell are no longer required. This provides the advantage of further reducing network traffic, since unnecessary information is not sent to the control node. The control node may send this information that no log entry is required either autonomously or as a response message.

The invention further provides a control node for controlling a first "base" cell of a communications network. The control node includes database for storing a neighbour cell list of the first cell. A receiver is provided for receiving a first automatic neighbour relation log and for receiving a log entry from a second automatic neighbour relation log relating to the first cell. A transmitter is configured to forward a log entry of the first automatic neighbour relation log to a neighbouring control node related to a second cell (a neighbouring cell to the "base cell) contained in the log. A processor is configured to update the neighbour cell list with neighbour cell parameters contained in the log entry of the second automatic neighbour relation log.

The control node is configured to receive only log entries from an automatic neighbour relation log which relate to cells under its control. Further, it only transmits log entries from a received automatic neighbour relation log to neighbouring network nodes controlling cells to which the log entries relate. This provides the advantage of saving network resources, since network traffic and load on the network are significantly reduced.

The invention also provides a subscriber station. The subscriber station includes a receiver for receiving an indication of a neighbouring cell. The subscriber station further includes a memory for automatically logging the indication of the neighbouring cell so as to collect an automatic neighbour relation log. A transmitter is provided for reporting a log entry from the automatic neighbour relation log to a control node controlling the cell to which the log entry relates.

The subscriber station only reports log entries relating to cells to control nodes controlling those cells. This means that data traffic and load on the network is advantageously reduced. Furthermore, using the subscriber station to report log entries from the automatic neighbour relation log especially provides for reduced data traffic on the interfaces between network nodes.

The invention further provides a computer program product including a program comprising software code portions being arranged, when run on a processor, to perform the steps of receiving an automatic neighbour relation log at a control node, forwarding a log entry from the automatic neighbour relation log to a neighbouring control node related to a cell contained in the log, receiving the log entry at the neighbouring control node, and updating a neighbour cell list of the related cell with neighbour cell parameters contained in the log entry.

The computer program product can include a computer-readable medium on which the software code portions are stored, and/or wherein the program is directly loadable into a memory of the processor. The processor may be provided in a network node, for example a radio network controller.

The invention will now be described, by way of example only, with reference to specific embodiments, and to the accompanying drawings, in which:

BRIEF DESCRIPTION OF THE DRAWINGS

FIG. 6 is a schematic diagram of an automatic neighbour relation log of neighbouring cells in a communications network;

FIG. 7 is a schematic diagram of an automatic neighbour relation log of neighbouring cells in a communications network;

DETAILED DESCRIPTION OF EXEMPLARY EMBODIMENTS

Figure 1:
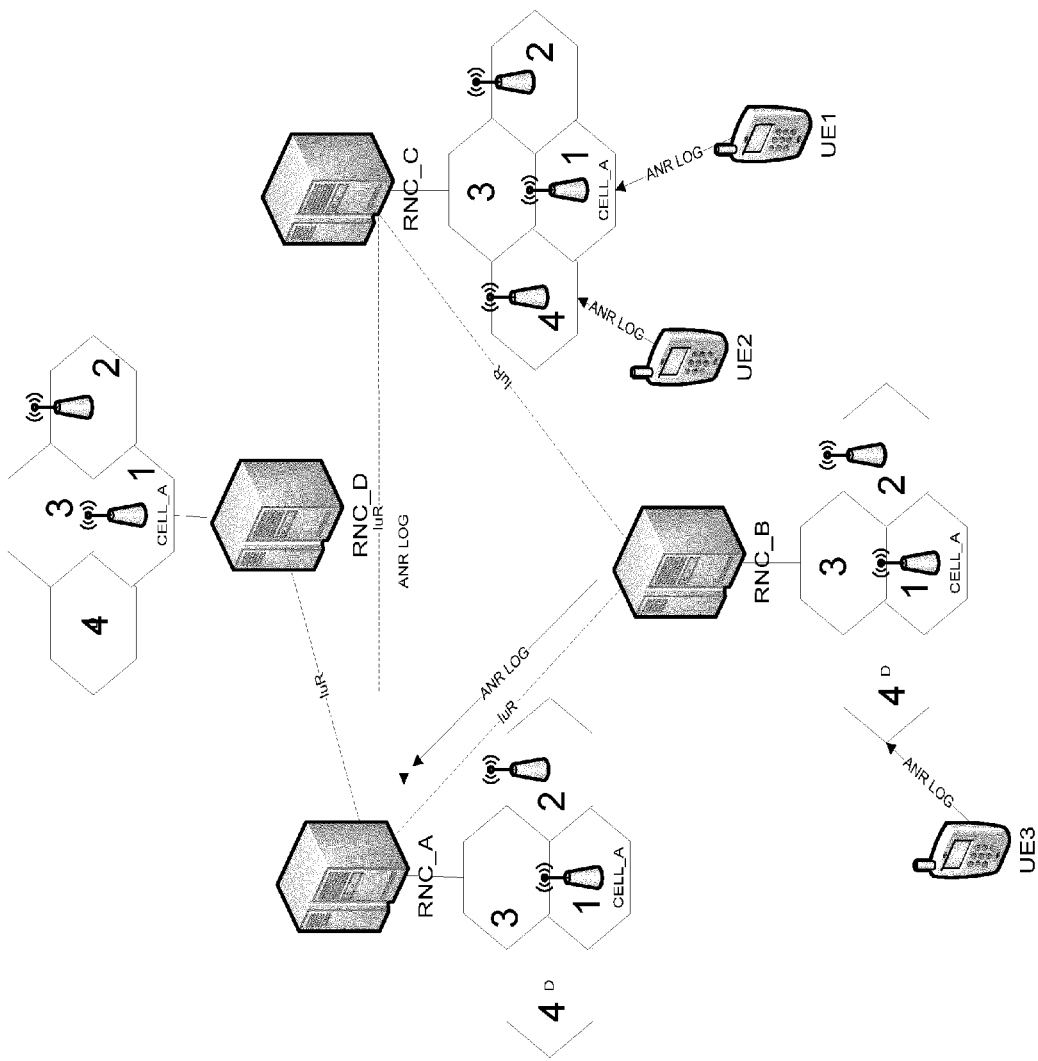
FIG. 1 is a simplified schematic diagram of a communications network according to an embodiment of the invention.

FIG. 1 shows a communications network, which includes four neighbouring radio network controllers (RNCs); RNC_A, RNC_B, RNC_C and RNC_D directly connected to each other via an Iur interface. Each RNC RNC_A, RNC_B, RNC_C, RNC_D controls four cells 1, 2, 3 and 4 over an Iub interface. Of course, in reality each RNC may control many more cells but only four are shown here for simplicity and clarity.

The network may be accessed by mobile stations UE1, UE2 and UE3 via the cells 1, 2, 3, 4 under control of each RNC.

Each mobile station UE1, UE2, UE3 is configured to perform automatic neighbour relation (ANR) measurement. The mobile station UE1, UE2, UE3 internally keeps logs of the newly detected cells which meet the criteria given in the ANR configuration of the network and reports the logs to the relevant RNC RNC_A, RNC_B, RNC_C, RNC_D when reporting criteria set in the ANR configuration are met. This is known as log based ANR.

In order to obtain information about a specific newly detected cell, the mobile station UE1, UE2, UE3 needs to decode the system information (SI) broadcasted on the cell. Due to the complexity and time-consuming procedure for system information reading and possible disruption of a higher service (for example paging or a user service) ANR measurement is performed by the mobile station UE1, UE2, UE3 while in an Idle state or a non-intensive user traffic state (for example a non-Cell_DCH state).

For example, if one of the mobile stations UE1, UE2, UE3 is camped on cell 1 of a source RNC RNC_A in an Idle state and detects a new neighbouring cell, for example cell 2 of a target RNC RNC_B, the mobile station keeps a record of those two cells after performing SI reading. Newly detected cells are added in sequence to the log.

The mobile station could move across several areas (for example across several RNCs within the same routing area) while in Idle mode or when no uplink signalling is established. In this case, the mobile station is unable to send the ANR log to the network and mobile station reporting of neighbour cells is performed by sending the ANR log to any arbitrary RNC in the network, which is neither the source RNC RNC_A nor the target RNC RNC_B. This arbitrary RNC, which is referred to as the Receiving RNC hereafter, forwards the ANR log from the mobile station to appropriate RNCs. In this example, the Receiving RNC is the RNC RNC_C, which sends the ANR log to the source RNC RNC_A and may also send the ANR log to the target RNC RNC_B.

The RNCs RNC_A and RNC_B then use the information received in the ANR log to build a neighbour relation table giving comprehensive cell information from the neighbouring RNCs controlling those neighbour cells.

In the above example, the RNC RNC_A, which will be referred to as the Base RNC hereafter, needs to obtain the attributes of the cell 2 under control of RNC_B from the neighbouring RNC RNC_B, and vice versa for RNC_B, in order to build symmetrical neighbour cell relations.

Duplicate cell detection can be avoided by using a mechanism in the mobile stations to keep track of the cell identities that have already been recorded. Therefore the mobile station UE1, UE2, UE3 only records a single entry for a single cell identity per frequency.

In order to avoid that identical missing neighbour relations are detected by several different mobile stations, along with the corresponding drastic increase in inter RNC signalling traffic over the Iur interface, the Receiving RNC and the Base RNC are coordinated to prevent unnecessary ANR log exchanges.

Figure 2:
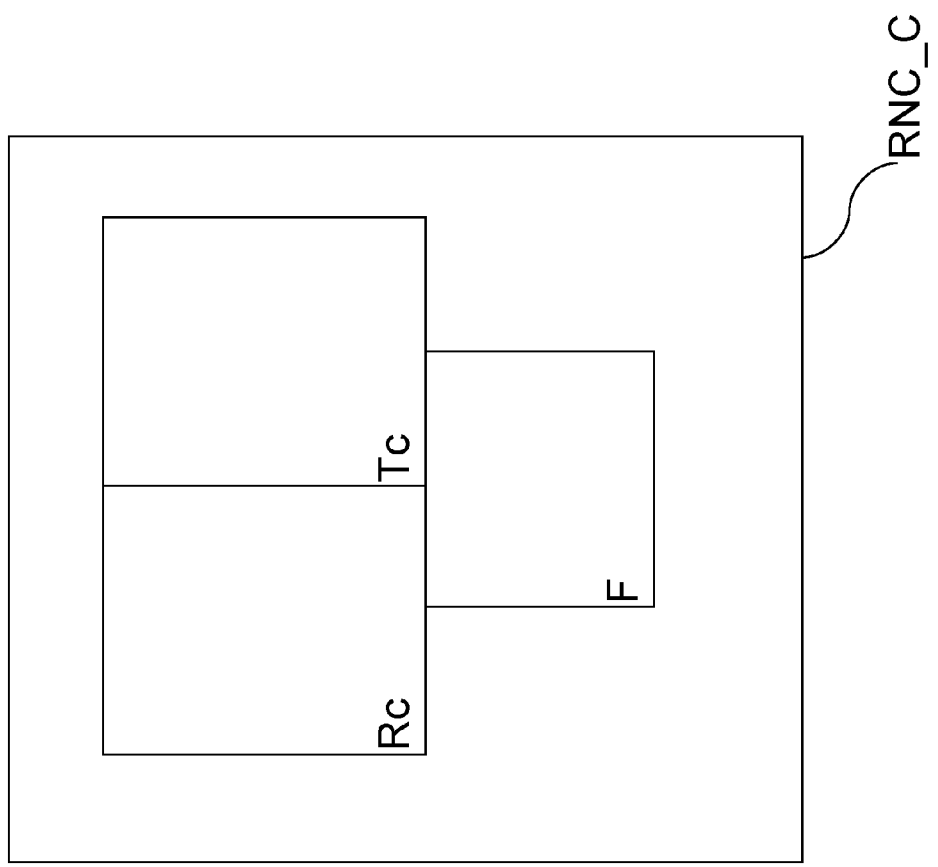
FIG. 2 is a simplified schematic diagram of a control node according to an embodiment of the invention.

The Receiving RNC RNC_C is shown in FIG. 2 and includes a receiver Rc for receiving an ANR log from a mobile station, e.g. UE1 or UE2. A filter F filters out ANR log entries that are irrelevant to cells controlled by the Base RNC RNC_A and a transmitter Tc is configured to send ANR log entries to the Base RNC RNC_A, which are relevant to Cells 1-4 controlled by the Base RNC RNC_A.

Figure 3:
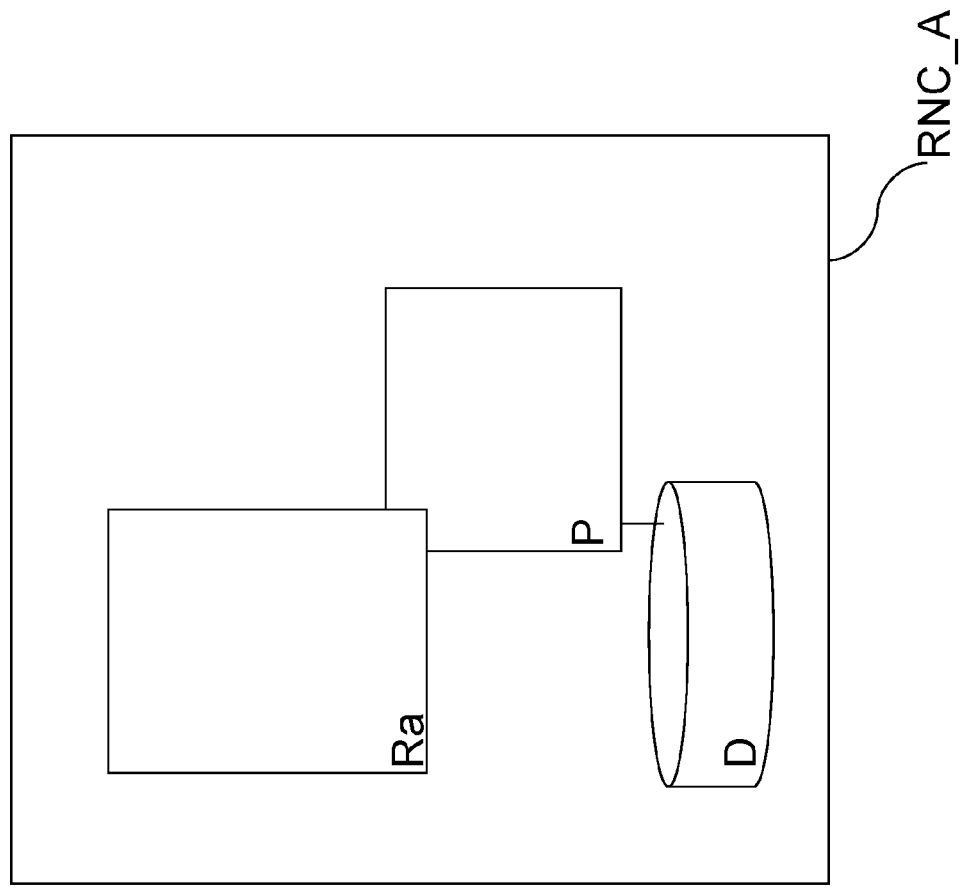
FIG. 3 is a simplified schematic diagram of a control node according to an embodiment of the invention.

FIG. 3 shows the Base RNC RNC_A, which includes a receiver Ra configured to receive ANR log entries from the Receiving RNC RNC_C that are relevant to Cells 1-4 controlled by the Base RNC RNC_A. The Base RNC RNC_A also has a database D, which stores a neighbour cell list of the Cells 1-4 controlled by RNC_A, and a processor P, which is configured to update the neighbour cell list stored in the database D with neighbour cell parameters contained in the log entries received by the receiver Ra.

Figure 4:
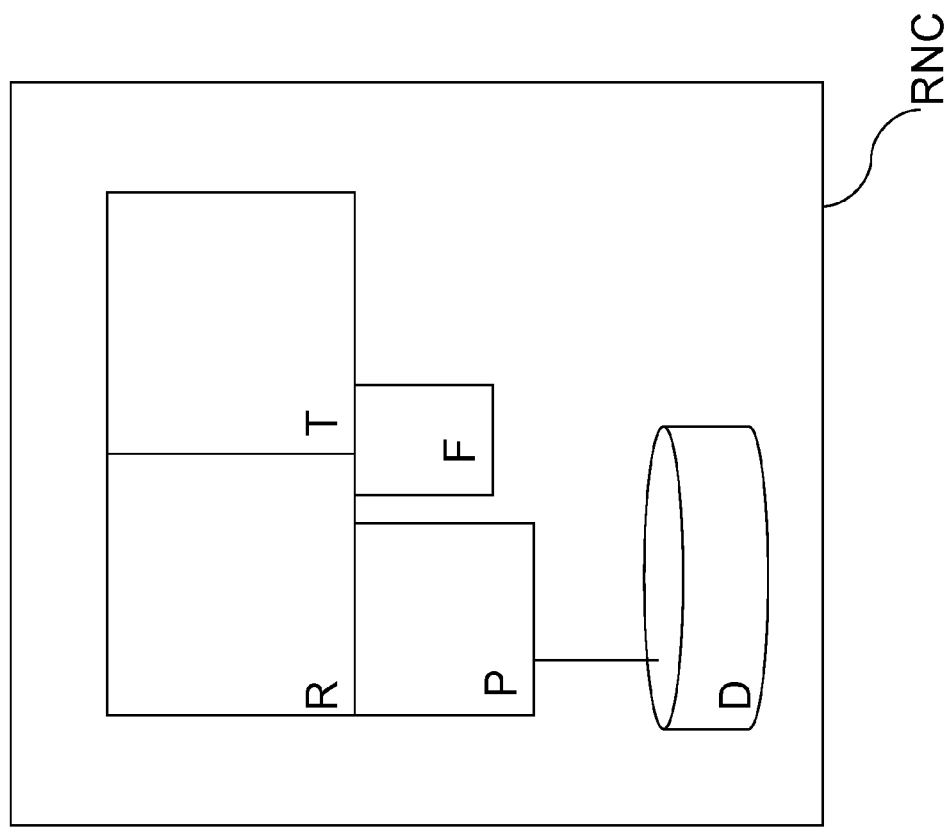
FIG. 4 is a simplified schematic diagram of a control node according to an embodiment of the invention.

In actual fact, the Receiving RNC RNC_C and the Base RNC RNC_A are structurally the same and are capable of performing both functions of Receiving and Base RNC. For example, the RNC RNC_A may also receive an ANR log from a mobile station camped on one of its cells and can send the relevant log entries to RNC_D and/or RNC_B relevant to those cells under their control. The general structure of the RNCs RNC_A, RNC_B, RNC_C, RNC_D is shown schematically in FIG. 4. Each RNC includes a receiver R for receiving an ANR log from a mobile station and for receiving log entries relevant to cells under its control. A filter F is provided for filtering out irrelevant log entries from the ANR log and a transmitter T sends only relevant log entries to another RNC relating to cells under its control. A database D stores neighbour cell lists relating to cells under control of the RNC and a processor P updates the database with log entries received at the receiver R.

Figure 5:
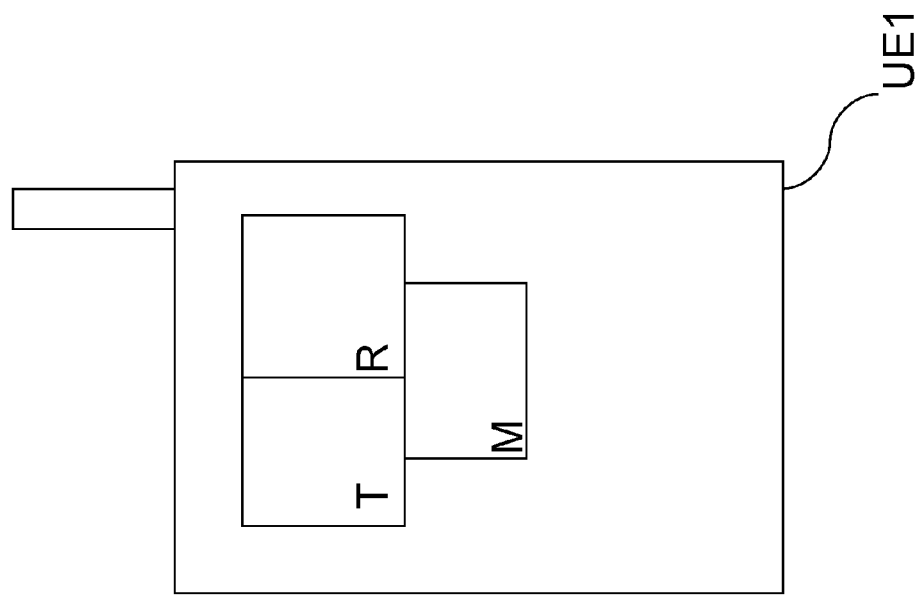
FIG. 5 is a simplified schematic diagram of a subscriber station according to an embodiment of the invention.

The mobile station UE1, UE2, UE3 is shown schematically in FIG. 5 and includes a receiver Rx configured to receive an indication of a neighbouring cell and a memory M, which automatically logs the indication of the neighbouring cell. In this way, an ANR log is collected by the mobile station UE1, UE2, UE3. A transmitter sends log entries of the ANR log to an RNC RNC_A, RNC_B, RNC_C, or RNC_D controlling a cell to which the log entries relate.

An example of an ANR log collected by the mobile station UE1 showing the neighbour relations for cells controlled by the RNCs RNC_A, RNC_B and RNC_C is shown in FIG. 6. FIG. 7 illustrates an ANR log collected by the mobile station UE2 and shows that a different mobile station may also provide information for the same neighbour relation. It can be seen by comparing FIG. 6 and FIG. 7 that the first entry of the ANR log of the mobile station UE1 and the second entry of the ANR log of the mobile station UE2 are identical.

Figure 8:
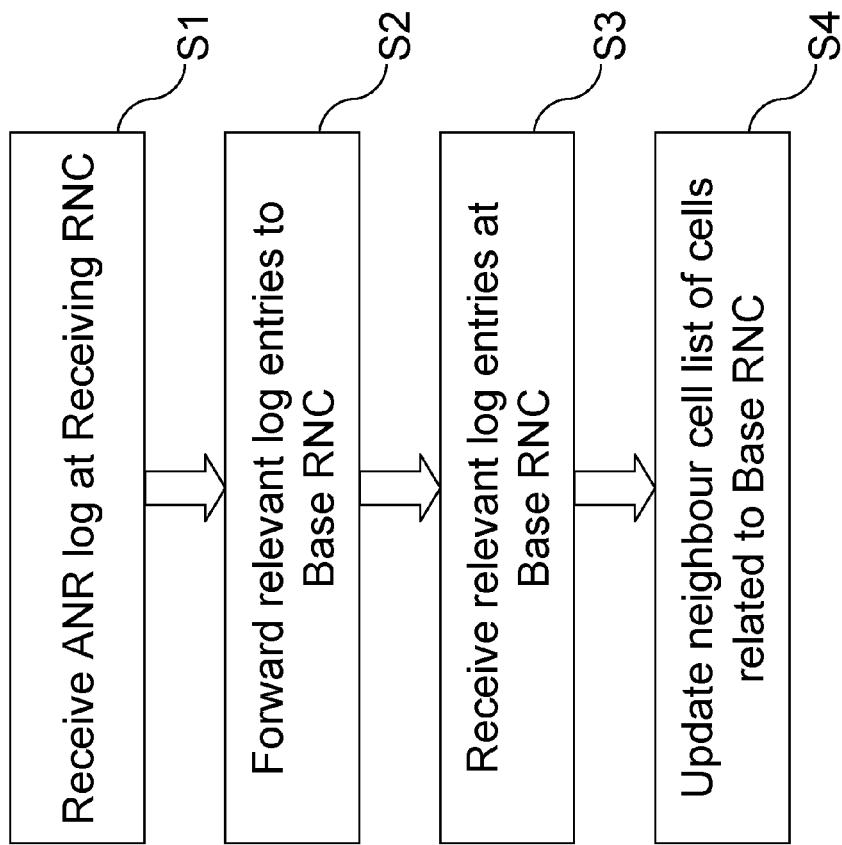
FIG. 8 is a flow diagram illustrating a method according to the invention.
Figure 9:
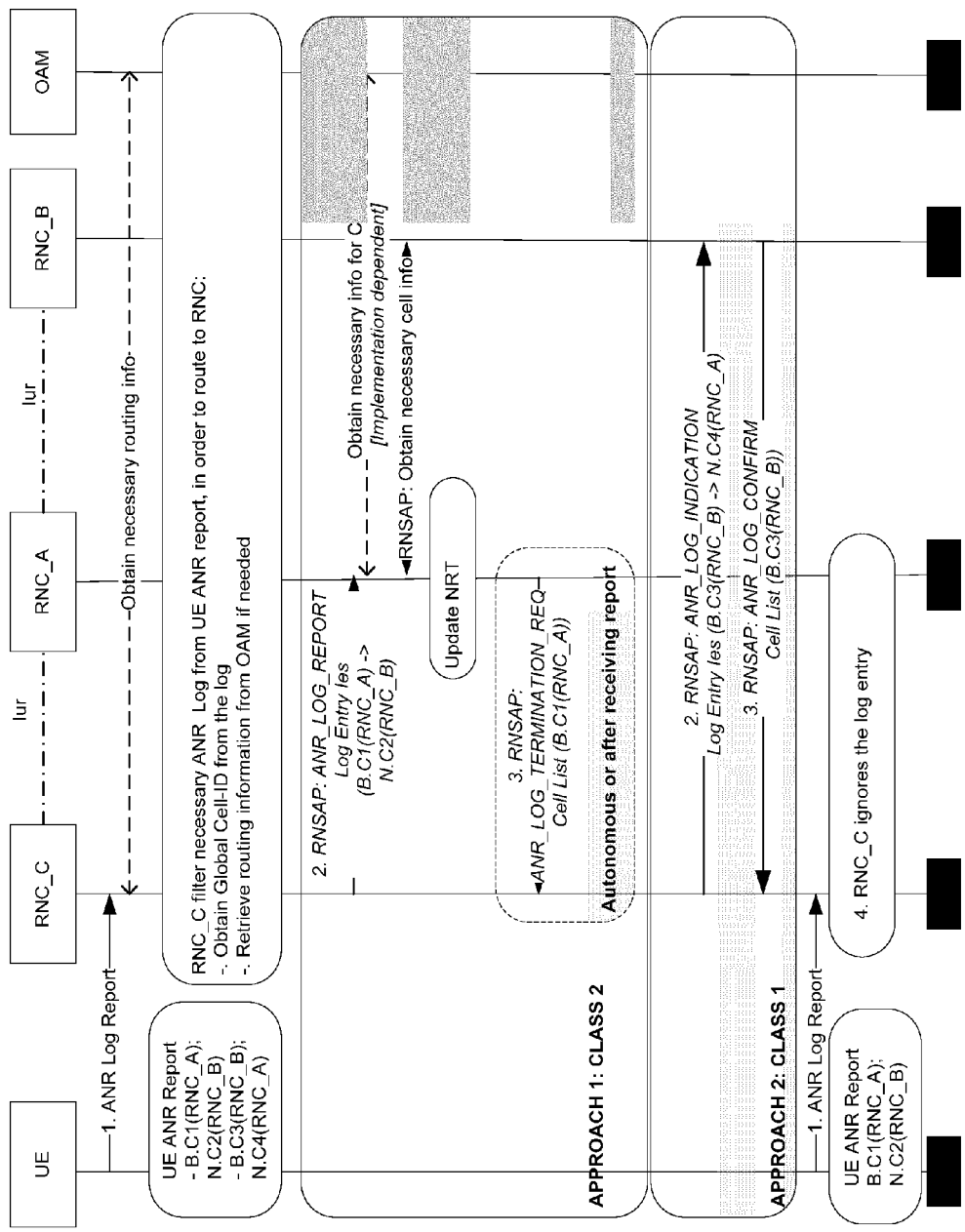
FIG. 9 is a message flow diagram illustrating a method according to the invention

This is avoided by filtering unnecessary log entries in the Receiving RNC RNC_C to avoid any redundant propagation of the ANR log to the Base RNC RNC_A as shown in the flow chart in FIG. 8. A procedure for coordinating the RNCs RNC_A RNC_B and RNC_C to avoid redundant ANR log propagation can be provided in 3GPP RNSAP and is illustrated in the message flow diagram in FIG. 9.

An ANR log is received at the Receiving RNC RNC_C from the mobile station UE1 over the Uu interface in step S1 of FIG. 8. Log entries from the ANR log which are not relevant to cells controlled by the Base RNC RNC_A are filtered out and only log entries relevant to cells controlled by the Base RNC RNC_A are forwarded from the Receiving RNC RNC_C (step S2). The relevant log entries are received at the Base RNC RNC_A from the Receiving RNC RNC_C (step S3) and the neighbour cell lists of the cells to which the log entries relate are updated with neighbour cell parameters contained in the log entries (step s4).

Filtering out of irrelevant ANR log entries may be implemented either as a Class 1 or a Class 2 procedure in RNSAP.

In the Class 1 procedure, the Receiving RNC RNC_C sends only the ANR log entry to the Base RNC RNC_A that is relevant to a cell under control of the Base RNC RNC_A. The Base RNC RNC_A may then respond with an optional parameter for indicating a prohibited list of cells for with ANR log reporting is not required. This procedure is triggered by the ANR log reporting from the mobile station UE1. The Receiving RNC RNC_C then ignores or discards the relevant log entries if they contain prohibited cells contained in the list.

In the Class 2 procedure, the Receiving RNC RNC_C indicates only the ANR log entry relevant to a cell under control of the Base RNC RNC_A to the Base RNC RNC_A in a request message. The Base RNC RNC_A may then send a message to the Receiving RNC RNC_C, either autonomously or as a response to a request message, including a list of cells for which ANR log reporting is not required. The trigger for the Base RNC RNC_A to send this message can either by set by the network operator and/or by the internal parameter of the Base RNC RNC_A for the maximum allowed number of neighbour relations. The Receiving RNC RNC_C then ignores or discards log entries relating to cells included on the list.

Using the above-described filtering mechanisms, the network traffic, particularly on the Iur interface between RNCs can be limited to the minimum required for necessary information exchange.

The relevant ANR log may also be sent from a different source other than the mobile station UE1 (for example UE2 or UE3) since the mobile station travels through the network in a non predetermined pattern and may be located in cells controlled by different RNCs.

In an enhancement to the method illustrated in FIG. 8, the Base RNC RNC_A informs the Receiving RNC RNC_C that a neighbour relation log entry for a specific cell is no longer required due to the maximum number of neighbour relations for that cell having already been reached. In current 3GPP specifications, the maximum number of neighbouring cells allowed for one specific cell is fixed to 32 cells. This value also determines the number of neighbouring cells broadcast to the mobile station.

Since it is the policy of mobile network operators to intentionally prevent a cell from being used for cell reselection or as a handover target, a further enhancement of the invention detects and reports these cells in the ANR log sent by the mobile station UE1, UE2, UE3. The Base RNC RNC_A then sends a cell "black list" to the Receiving RNC RNC_C indicating that ANR log reporting is not required for those cells.

In a further enhancement, the Base RNC RNC_A indicates to the Receiving RNC RNC_C, either autonomously or using a response message, its preference for reporting of the ANR log.

For the purpose of the present invention as described hereinabove, it should be noted that method steps likely to be implemented as software code portions and being run using a processor at a network control element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses and network devices, or any one of their respective units/means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

The terms "user equipment (UE)" and "mobile station" described herein may refer to any mobile or stationary device including a mobile telephone, a portable computer, a mobile broadband adapter, a USB stick for enabling a device to access to a mobile network, etc.

The exemplary embodiments of the invention have been described above with reference to a 3GPP UMTS network. However, the above-described examples may be applied to any wireless communications network.

Although the invention has been described hereinabove with reference to specific embodiments, it is not limited to these embodiments, and no doubt further alternatives will occur to the skilled person that lie within the scope of the invention as claimed.

The invention claimed is:

1. An apparatus comprising:
   at least one processor; and
   at least one memory including computer program code, the at least one memory and the computer program code configured, with the at least one processor, to cause the apparatus to perform the following:
   receive an automatic neighbour relation log from a user equipment, said automatic neighbour relation log listing cells detected by the user equipment;
   remove one or more log entries relating to a cell not controlled by a neighbouring control node from the automatic neighbour relation log, said neighbouring control node being directly coupled to said apparatus;
   receive information from the neighbouring control node indicating that one or more log entries for the cell related to the neighbouring control node are not relevant; and
   forward one or more log entries of the automatic neighbour relation log relating to a cell controlled by the neighbouring control node only to the neighbouring control node, thereby reducing network traffic by not including automatic neighbour relation log entries that are not required and speeding up a process of defining neighbour cell relationships in the cell.

2. The apparatus according to claim 1, wherein the at least one memory and the computer program code are further configured, with the at least one processor, to indicate only the one or more log entries relevant to the cell related to the neighbouring control node.

3. The apparatus according to claim 1, wherein the at least one memory and the computer program code are further configured, with the at least one processor, to send only the one or more log entries relevant to the cell related to the neighbouring control node.

4. The apparatus according to claim 1, wherein the apparatus is a radio network controller.

5. A method comprising:
   receiving an automatic neighbour relation log from a user equipment, said automatic neighbour relation log listing cells detected by the user equipment;
   removing one or more log entries relating to a cell not controlled by a neighbouring control node from the automatic neighbour relation log;
   receiving information from the neighbouring control node indicating that one or more log entries for the cell related to the neighbouring control node are not relevant; and
   forwarding one or more log entries of the automatic neighbour relation log relating to a cell controlled by the neighbouring control node only to the neighbouring control node, thereby reducing network traffic by not including automatic neighbour relation log entries that are not required and speeding up a process of defining neighbour cell relationships in the cell.

6. The method according to claim 5, wherein the step of forwarding comprises indicating only the one or more log entries relevant to the cell related to the neighbouring control node.

7. The method according to claim 5, wherein the step of forwarding comprises sending only the one or more log entries relevant to the cell related to the neighbouring control node.

8. A computer program product comprising a non-transitory computer-readable storage medium bearing computer program code embodied therein for use with a computer, the computer program code comprising code for performing:
   receiving an automatic neighbour relation log from a user equipment, said automatic neighbour relation log listing cells detected by the user equipment;
   removing one or more log entries relating to a cell not controlled by a neighbouring control node from the automatic neighbour relation log;
   receiving information from the neighbouring control node indicating that one or more log entries for the cell related to the neighbouring control node are not relevant; and
   forwarding one or more log entries of the automatic neighbour relation log relating to a cell controlled by the neighbouring control node only to the neighbouring control node, thereby reducing network traffic by not including automatic neighbour relation log entries that are not required and speeding up a process of defining neighbour cell relationships in a cell.

9. The computer program product according to claim 8, wherein the step of forwarding comprises indicating only the one or more log entries relevant to the cell related to the neighbouring control node.

10. The computer program product according to claim 8, wherein the step of forwarding comprises sending only the one or more log entries relevant to the cell related to the neighbouring control node.

* * * * *